United States Patent
Yanagisawa et al.

(10) Patent No.: US 6,355,710 B1
(45) Date of Patent: Mar. 12, 2002

(54) RUBBER COMPOSITION

(75) Inventors: Kazuhiro Yanagisawa, Tokyo; Masaaki Tsuchihashi, Wakayama-ken; Isao Nishi, Wakayama-ken; Tetsuo Takano, Wakayama-ken, all of (JP)

(73) Assignees: Bridgestone Corporation; Kao Corporation, both of Tokyo (JP)

( * ) Notice: Subject to any disclaimer, the term of this patent is extended or adjusted under 35 U.S.C. 154(b) by 0 days.

(21) Appl. No.: 09/648,533

(22) Filed: Aug. 28, 2000

(30) Foreign Application Priority Data

Aug. 27, 1999 (JP) .......................... 11-241010

(51) Int. Cl.$^7$ ............................... C08K 5/29
(52) U.S. Cl. ..................... 524/238; 523/218; 524/242; 524/449; 524/450; 524/493; 524/494; 152/905
(58) Field of Search ................... 524/238, 242, 524/493, 494, 449, 450; 523/218; 152/905

(56) References Cited

U.S. PATENT DOCUMENTS

| | | | | |
|---|---|---|---|---|
| 2,349,733 A | * | 5/1944 | Howland | 524/238 |
| 2,955,100 A | * | 10/1960 | Hill et al. | 524/238 |
| 3,013,997 A | * | 12/1961 | Coler et al. | 524/238 |
| 3,042,630 A | * | 7/1962 | Adams et al. | 524/238 |
| 3,321,456 A | * | 5/1967 | Braus et al. | 524/238 |
| 3,435,021 A | * | 3/1969 | Rombusch et al. | 524/238 |
| 3,441,553 A | * | 4/1969 | Rombusch et al. | 524/238 |
| 3,499,856 A | * | 3/1970 | Funatsu et al. | 524/238 |
| 3,548,036 A | * | 12/1970 | Pohlemann et al. | 524/238 |
| 3,634,380 A | * | 1/1972 | Rombusch et al. | 524/238 |
| 3,700,690 A | * | 10/1972 | Burke | 524/238 |
| 3,873,489 A | * | 3/1975 | Thurn et al. | 524/262 |
| 3,928,276 A | * | 12/1975 | Linden et al. | 524/238 |
| 3,975,325 A | * | 8/1976 | Long | 252/609 |

FOREIGN PATENT DOCUMENTS

| | | | | |
|---|---|---|---|---|
| EP | 0 857 752 A2 | 8/1998 | ........... | C08L/21/00 |
| EP | 0 992 535 A1 | 4/2000 | ........... | C08K/9/06 |
| WO | 84/04530 | 11/1984 | ........... | C08L/21/00 |

OTHER PUBLICATIONS

H. Ismail et al, "The effects of cationic surfactant (fatty diamine) and a commercial silane coupling agent on the properties of a silica filled natural rubber compound", Eur. Polym. J., vol. 33, No. 1, 1997, pp. 1–6, XP002155127.

Database CHEMABS Online! Chemical Abstracts Service, Columbus, Ohio, US: Ognevskij. L. A.: "Oleic acid–palmitic acid blend and their mono–di, and triethanolamine salts in activator–dispersant mixtures for rubber compounds", XP002155126, *abstract* corresponding to Chem. Abstracts 124:263182 of Russian Patent 2037503 published Jun. 19, 1995.

* cited by examiner

Primary Examiner—Veronica P. Hoke
(74) Attorney, Agent, or Firm—Sughrue Mion, PLLC

(57) ABSTRACT

A rubber composition comprising (A) at least one natural or synthetic diene rubber, (B) an inorganic filler comprising at least one of silica and silicates as the main component and (C) an addition salt of an amine represented by general formula (I):

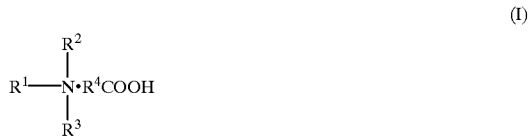

wherein $R^1$ represents a $C_8$ to $C_{24}$ alkyl group, an aryl group or an aralkyl group, $R^2$ and $R^3$ represent a hydrogen atom, a $C_1$ to $C_{12}$ alkyl group, an aryl group, an aralkyl group or a hydroxyalkyl group and $R^4$ represents a $C_6$ to $C_{24}$ alkyl or alkenyl group, an aryl group or an aralkyl group; and a pneumatic tire produced by using the rubber composition.

8 Claims, No Drawings

RUBBER COMPOSITION

BACKGROUND OF THE INVENTION

1. Field of the Invention

The present invention relates to a rubber composition and a pneumatic tire produced by using the rubber composition and, more particularly, to a rubber composition which comprises, as a reinforcing filler, an inorganic filler comprising silica and/or silicate as the main component and exhibits improved fuel consumption, workability and productivity in vulcanization, and a pneumatic tire produced by using the rubber composition.

2. Description of the Related Arts

Heretofore, carbon black has been generally used as a reinforcing filler for rubber composition because carbon black can provide higher reinforcement and more excellent abrasion resistance than other fillers.

In recent years, energy consumption of automobiles must be decreased to achieve energy saving as the social requirement. To decrease heat buildup of a rubber composition for tires for this purpose, carbon black may be used in a smaller amount, or carbon black having a greater particle diameter may be used. It is known, however, that the reinforcing property, abrasion resistance and wet skid resistance inevitably deteriorate when any of the above methods is used.

As a filler which can achieve both of a smaller heat buildup and an improved wet skid resistance, hydrous silica (precipitated silica) has been known. The use of precipitated silica is described in many patent applications such as Japanese Patent Applications Laid-Open Nos. Heisei 3(1991)-252431, Heisei 6(1994)-248116, Heisei 7(1995)-70369, Heisei 7(1995)-188466, Heisei 7(1995)-196850, Heisei 8(1996)-225684, Heisei 8(1996)-245838 and Heisei 8(1996)-33687.

Particles of silica, however, tend to aggregate together through hydrogen bonding of a silanol group which is a functional group present on the surface of a silica particle and this phenomenon causes drawbacks. For example, it is necessary that the time for mixing be increased to improve dispersion of silica into rubber, Mooney viscosity of a rubber composition containing silica increases due to insufficient dispersion of silica into rubber, and workability in processing such as extrusion becomes poor.

Moreover, since the surface of a silica particle is acidic, basic substance used as a vulcanization accelerator is adsorbed on its surface. This causes an insufficient vulcanization which leads to an undesirably low modulus value.

To overcome the above problems, a silane coupling agent has been developed. Dispersion of silica into rubber still, however, remains insufficient and, in particular, it is difficult to achieve an industrially excellent dispersion of silica.

Under the above circumstances, the present inventors proposed a rubber composition comprising a specific tertiary amine in combination with silica (International Patent Publication No. 97-35461). In this rubber composition, dispersion of silica is improved, viscosity of unvulcanized rubber is low, heat buildup decreases and abrasion resistance is improved. The rubber composition is, however, not sufficiently satisfactory with respect to the scorching property and the vulcanization time.

It is known that retardation in vulcanization can be prevented by adding an activator such as polyethylene glycol, diethylene glycol, triethanolamine and a hydroxyl fatty acid salt of triethanolamine to a rubber composition containing silica. Scorching of the rubber composition, however, tends to take place when an activator is added, undesirable phenomenon such as deterioration in the workability takes place and, further, no improvement in low heat buildup property is observed.

SUMMARY OF THE INVENTION

The present invention has an object to provide a rubber composition which exhibits excellent dispersion of an inorganic filler containing at least one filler selected from silica and silicates as the main component and, as the result of the excellent dispersion, can achieve decreased viscosity of unvulcanized rubber, excellent workability, improved fuel consumption, a decreased time of vulcanization and improved productivity in vulcanization, and a pneumatic tire produced by using the rubber composition.

As the result of intensive studies by the present inventors to achieve the above object, it was found that the above object can be achieved by using a rubber composition comprising a specific addition salt of an amine and, optionally, a coupling agent in combination with an inorganic filler containing silica and/or silicate as the main component. The present invention has been completed based on the above knowledge.

The present invention provides:
(1) A rubber composition which comprises (A) at least one rubber component selected from the group consisting of natural rubber and diene synthetic rubbers, (B) an inorganic filler comprising at least one filler selected from the group consisting of silica and silicate as a main component, (C) an addition salt of an amine represented by general formula (I):

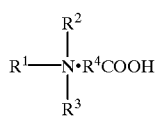

(I)

wherein $R^1$ represents a saturated or unsaturated alkyl group having 8 to 24 carbon atoms, an aryl group having 6 to 24 carbon atoms or an aralkyl group having 7 to 24 carbon atoms, $R^2$ and $R^3$ each independently represent hydrogen atom, a saturated or unsaturated alkyl group having 1 is to 12 carbon atoms, an aryl group having 6 to 12 carbon atoms, an aralkyl group having 7 to 12 carbon atoms or a group represented by any of general formulae:

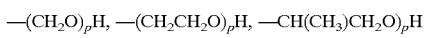

and

wherein a total of p representing an integer of 1 to 4 when at least one of $R^2$ and $R^3$ represents any of above groups, and $R^4$ represents a saturated or unsaturated alkyl group having 6 to 24 carbon atoms, an aryl group having 6 to 24 carbon atoms or an aralkyl group having 7 to 24 carbon atoms, and, optionally, (D) a coupling agent in an amount of 1 to 20% by weight of component (B); and
(2) A pneumatic tire produced by using the above rubber composition.

DESCRIPTION OF THE PREFERRED EMBODIMENTS

In the rubber composition of the present invention, one or more of rubber selected from the group consisting of natural rubber and diene synthetic rubber is used as component (A). Examples of the diene synthetic rubbers include polyisoprene rubber (IR), polybutadiene rubber (BR), styrene-butadiene rubber (SBR), acrylonitrile-butadiene rubber (NBR), chloroprene rubber (CR) and butyl rubber (IIR) and halogenated butyl rubber.

Any of the natural rubber and the diene synthetic rubber of component (A) can be used singly or in combination of two or more.

In the composition of the present invention, an inorganic filler comprising silica and/or silicate as the main component is used as component (B).

The type of the above inorganic filler is not particularly limited. Examples of the inorganic filler include precipitated silica, fumed silica, aluminum silicate such as kaolin and clay, magnesium silicate, calcium silicate and aluminum hydroxide. Among these inorganic fillers, precipitated silica is preferable. It is preferable that the inorganic filler comprising silica and/or silicate as the main component has a specific surface area in the range of 80 to 300 m²/g as measured in accordance with the mercury porosimetry method. Due to the specific surface area in the range of 80 to 300 m²/g, dispersion of the inorganic filler into the rubber is improved and the rubber composition can exhibit excellent workability and abrasion resistance. From the standpoint of the balance between the reinforcing property, workability and abrasion resistance, it is more preferable that the specific surface area is in the range of 100 to 250 m²/g. The specific surface area $S_{Hg}$ is calculated in accordance with the following equation: $S_{Hg}(m^2/g)=2V/r$, wherein pores are considered to be cylinders, $V(m^3/g)$ represents the total volume of the pores and r(m) represents the average diameter of the pores.

In the rubber composition of the present invention, it is preferable that the content of the inorganic filler comprising silica and/or silicate as the main component of component (B) is in the range of 10 to 140 parts by weight per 100 parts by weight of rubber component (A). Due to the content of the inorganic filler in the range of 10 to 140 parts by weight, the object of the present invention can be achieved without adverse effects on the reinforcing property and other physical properties of the rubber. From the standpoint of the reinforcing property and other physical properties, it is more preferable that the content is in the range of 20 to 90 parts by weight.

In the rubber composition of the present invention, as component (C), an addition salt of an amine represented by the following general formula (I) is used:

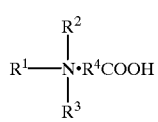

(I)

In the above general formula (I), $R^1$ represents a saturated or unsaturated alkyl group having 8 to 24 carbon atoms, an aryl group having 6 to 24 carbon atoms or an aralkyl group having 7 to 24 carbon atoms. The above alkyl group can be a linear alkyl group, a branched alkyl group or a cyclic alkyl group. Examples of the alkyl group include various types of octyl groups (such as n-octyl group, branched octyl groups and cyclooctyl group; "various types" means similarly in the following), various types of nonyl groups, various types of decyl groups, various types of dodecyl groups, various types of tetradecyl groups, various types of hexadecyl groups, various types of octadecyl groups, various types of behenyl groups, various types of octenyl groups, various types of decenyl groups and oleyl group. The aryl group having 6 to 24 carbon atoms may have a suitable substituent such as a lower alkyl group on the aromatic ring. Examples of the aryl group include phenyl group, various types of tolyl groups, various types of xylyl groups, α- and β-naphthyl groups, various types of methylnaphthyl groups and various types of dimethylnaphthyl groups. The aralkyl group having 7 to 24 carbon atoms may have a suitable substituent such as a lower alkyl group on the aromatic ring. Examples of the aralkyl group include benzyl group, various types of methylbenzyl groups, phenetyl group, various types of methylphenyl groups, various types of naphthylmethyl groups and various types of (methylnaphthyl)methyl groups.

$R^2$ and $R^3$ each independently represents a hydrogen atom, a saturated or unsaturated alkyl group having 1 to 12 carbon atoms, an aryl group having 6 to 12 carbon atoms, an aralkyl group having 7 to 12 carbon atoms or a group represented by any of the following formulae:

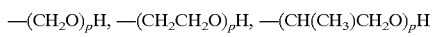

and

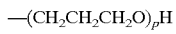

wherein the total of p represents an integer of 1 to 4 when any of $R^2$ and $R^3$ represents one of above groups. The groups represented by $R^2$ and $R^3$ may be the same with or different from each other. The above saturated or unsaturated alkyl group having 1 to 12 carbon atoms can be a linear alkyl group, a branched alkyl group or a cyclic alkyl group. Examples of the alkyl group include methyl group, ethyl group, n-propyl group, isopropyl group, various types of butyl groups, various types of pentyl groups, various types of hexyl groups, various types of octyl groups, various types of decyl groups, various types of dodecyl groups, propenyl group, allyl group, various types of pentenyl groups, various types of hexenyl groups, various types of octenyl groups and various types of decenyl groups. The aryl group having 6 to 12 carbon atoms may have a suitable substituent such as a lower alkyl groups on the aromatic ring. Examples of the aryl group include phenyl group, various types of tolyl groups, various types of xylyl groups, α- and β-naphthyl groups and various types of methylnaphthyl groups. The aralkyl group having 7 to 12 carbon atoms may have a suitable substituent such as a lower alkyl groups on the aromatic ring. Examples of the aralkyl group include benzyl group, various types of methylbenzyl group, phenetyl group, various types of methylphenetyl group and various types of naphthylmethyl groups.

$R^4$ represents a saturated or unsaturated alkyl group having 6 to 24 carbon atoms, an aryl group having 6 to 24 carbon atoms or an aralkyl group having 7 to 24 carbon atoms. The above saturated or unsaturated alkyl group having 6 to 24 carbon atoms may be a linear alkyl group, a branched alkyl group or a cyclic alkyl group. Examples of the alkyl group include various types of hexyl groups, various types of octyl groups, various types of nonyl groups, various types of decyl groups, various types of dodecyl groups, various types of tetradecyl groups, various types of hexadecyl groups, various types of octadecyl groups, various types of behenyl groups, various types of hexenyl groups, various types of octenyl groups, various types of decenyl groups and oleyl group. Any of the aryl group having 6 to 24 carbon atoms and the aralkyl group having 7 to 24 carbon atoms may have a suitable substituent such as a lower alkyl group on the aromatic ring. Examples of the aryl group and the aralkyl group are the same as those described above as the examples of the groups represented by $R^1$.

Examples of the amine constituting the addition salt of an amine represented by general formula (I) include decylamine, laurylamine, myristylamine, palmitylamine, stearylamine, behenylamine, oleylamine, monomethyldecylamine, monomethyllaurylamine, monomethylmyristylamine, monomethylpalmitylamine, monomethylstearylamine, monomethyl-oleylamine, monoethyldecylamine, monoethyllaurylamine, monoethylmyristylamine, monoethylpalmitylamine, monoethylstearylamine, monoethyloleylamine, monopropyldecylamine, monopropyllaurylamine, monopropylmyristylamine, monopropylpalmitylamine, monopropyl-stearylamine, monopropyloleylamine, dimethyldecylamine, dimethyl-laurylamine, dimethylmyristylamine, dimethylpalmitylamine, dimethylstearylamine, dimethyloleylamine, diethyldecylamine, diethyllaurylamine, diethylmyristylamine, diethylpalmitylamine, diethylstearylamine, diethyloleylamine, methylethyldecylamine, methylethyllaurylamine, methylethylmyristylamine, methylethylpalmitylamine, methylethylstearylamine, methylethyloleylamine, di(hydroxyethyl)decylamine, di(hydroxyethyl)laurylamine, di(hydroxyethyl)myristylamine, di(hydroxyethyl) palmitylamine, di(hydroxyethyl)stearylamine and di(hydroxyethyl)oleylamine. Among these compounds, tertiary alkylamines in which the groups represented by each of $R^2$ and $R^3$ is a saturated or unsaturated alkyl group having 1 to 8 carbon atoms and the total number of carbon atoms in the groups represented by $R^1$, $R^2$ and $R^3$ is 10 to 24 are preferable.

As the carboxylic acid forming the addition salt of an amine, linear fatty acids in which the group represented by $R^4$ has 10 to 20 carbon atoms are preferable. Examples of the carboxylic acid include capric acid, lauric acid, myristic acid, palmitic acid, stearic acid, arachic acid, behenic acid and oleic acid.

It is preferable that the addition salt of an amine represented by general formula (I) described above has a molecular weight in the range of 400 to 800.

In the present invention, the addition salt of an amine of component (C) may be used singly or in combination of two or more. It is preferable that component (C) satisfies following equation (II):

$$3\times10^5 \leq B_w \times C_M \times S_{Hg}/C_W \leq 4\times10^6 \quad (II)$$

wherein $B_w$ is the amount in part by weight of component (B), $C_W$ is the amount by parts by weight of component (C), $C_M$ is the molecular weight of component (C) and $S_{Hg}$ (m²/g) is the specific surface area of component (B) measured in accordance with a mercury porosimetry. From the standpoint of sufficiently exhibiting the effect of the present invention, it is preferable that the value of $(B_w \times C_M \times S_{Hg}/C_W)$ is in the above range and more preferably in the range of $4\times10^5$ to $2\times10^6$.

The above addition salt of an amine represented by general formula (I) may contain 0.1 to 10% of an inorganic salt such as a salt of phosphoric acid or a salt of phosphorous acid in order to improve strength of flakes or grains and to prevent aggregation which tends to take place at high temperatures in the summer time.

The rubber composition of the present invention may further comprise a coupling agent as component (D), where desired, to further enhance the effect of the present invention.

As the coupling agent, any desired coupling agent may be selected and used from conventional coupling agents. In particular, it is preferable that the coupling agent is selected and used from the group consisting of:

compounds represented by general formula (III):

$$A_m B_{3-m} Si—X—S_a—X—SiA_m B_{3-m} \quad (II)$$

wherein A represents $C_n H_{2n+1} O$, n representing an integer of 1 to 3, or a chlorine atom, B represents an alkyl group having 1 to 3 carbon atoms, X represents a saturated or unsaturated alkylene group having 1 to 9 carbon atoms or an arylene group having 7 to 15 carbon atoms, m represents an integer of 1 to 3, a represents an integer of 1 or greater which may have a distribution, two groups represented by B may be the same with or different from each other when m represents 1 and two or three groups represented by A may be the same with or different from each other when m represents 2 or 3, respectively;

compounds represented by general formula (IV):

$$A_m B_{3-m} Si—X—Y \quad (IV)$$

wherein A represents $C_n H_{2n+1} O$, n representing an integer of 1 to 3, or a chlorine atom, B represents an alkyl group having 1 to 3 carbon atoms, X represents a saturated or unsaturated alkylene group having 1 to 9 carbon atoms or an arylene group having 7 to 15 carbon atoms, Y represents a mercapto group, a vinyl group, an amino group, a glycidoxy group or an epoxy group, m represents an integer of 1 to 3, two groups represented by B may be the same with or different from each other when m represents 1 and two or three groups represented by A may be the same with or different from each other when m represents 2 or 3, respectively; and compounds represented by general formula (V):

$$A_m B_{3-m} Si—X—S_a—Z \quad (V)$$

wherein A represents $C_n H_{2n+1} O$, n representing an integer of 1 to 3, or a chlorine atom, B represents an alkyl group having 1 to 3 carbon atoms, X represents a saturated or unsaturated alkylene group having 1 to 9 carbon atoms or an arylene group having 7 to 15 carbon atoms, Z represents a benzothiazolyl group, an N,N-dimethylthiocarbamoyl group, a methacryloyl group or a saturated or unsaturated hydrocarbon group having 1 to 15 carbon atoms, m represents an integer of 1 to 3, a represents an integer of 1 or greater which may have a distribution, two groups represented by B may be the same with or different from each other when m represents 1 and two or three groups represented by A may be the same with or different from each other when m represents 2 or 3, respectively.

Examples of the coupling agent represented by general formula (III) include bis(3-triethoxysilylpropyl)tetrasulfide, bis(3-trimethoxysilylpropyl)tetrasulfide, bis(3-methyldimethoxysilylpropyl)tetrasulfide, bis(3-triethoxysilylethyl)tetrasulfide, bis(3-triethoxysilylpropyl) disulfide, bis(3-trimethoxysilylpropyl)disulfide and bis(3-triethoxysilylpropyl)trisulfide. Examples of the coupling agent represented by general formula (IV) include 3-mercaptopropyltrimethoxysilane, 3-mercaptopropyltriethoxysilane, vinyltriethoxysilane, vinyltrimethoxysilane, 3-aminopropyltriethoxysilane, 3-aminopropyltrimethoxysilane, 3-mercaptopropylmethyldimethoxysilane, γ-glycidoxypropyltrimethoxysilane and γ-glycidoxypropylmethyldiethoxysilane. Examples of the coupling agent represented by general formula (V) include 3-trimethoxysilylpropyl-N,N-dimethylcarbamoyl tetrasulfide, 3-trimethoxysilylpropylbenzothiazolyl tetrasulfide, 3-trimethoxysilylpropylmethacryloyl monosulfide and 3-triethoxysilylpropyl-n-octyl disulfide.

In the present invention, the coupling agent which is used optionally may be used singly or in combination of two or more. Preferably, the content of the coupling agent in the composition is selected in the range of 1 to 20% by weight of component (B) described above. When the content is less than 1% by weight, the effect of the coupling agent may not sufficiently be exhibited. When the content exceeds 20% by weight, the content may cause an economic disadvantage while the effect may not increase to the extent expected from the content. From the standpoint of the effect of the coupling agent and economy, it is more preferable that the content of the coupling agent of component (D) is in the range of 3 to 15% by weight.

The rubber composition of the present invention may further comprise various additives conventionally used in the rubber industry such as carbon black, a vulcanizing agent, a vulcanization accelerator, an antioxidant, a scorch retarder, a softener, zinc oxide and stearic acid as long as the object of the present invention is not adversely affected.

The rubber composition of the present invention can be advantageously used for tread rubber or base tread rubber of tires.

The pneumatic tire of the present invention can be produced in accordance with a conventional process by using the rubber composition of the present invention. The rubber composition of the present invention which comprises various additives described above, where necessary, is extruded and processed to obtain a tread member. The tread member is laminated and molded on a tire building machine in accordance with a conventional method and a green tire is produced. The produced green tire is treated under heat and pressure in a vulcanizer and a tire is produced.

The pneumatic tire of the present invention produced as described above exhibits excellent abrasion resistance and improved fuel consumption. Moreover, excellent productivity can be obtained due to the reduced vulcanization time.

In the present invention, since the amine component in the addition salt of an amine masks acidic silanol groups present on the surface of silica and/or silicate, aggregation of the filler which takes place due to the interaction between the silanol groups is prevented and dispersion of the filler is improved. Therefore, viscosity of rubber decreases and the fuel consumption is improved.

To summarize the advantages obtained by the present invention, the rubber composition of the present invention exhibits excellent dispersion of an inorganic filler containing silica or silicate as the main component and, as the result of the excellent dispersion, can achieve decreased viscosity and excellent workability of unvulcanized rubber, improved fuel consumption, a decreased time of vulcanization and improved productivity in vulcanization. The rubber composition can be advantageously used for pneumatic tires.

EXAMPLES

The present invention will be described more specifically with reference to examples in the following. However, the present invention is not limited to the examples.

The physical properties of the rubber compositions obtained in the examples were measured in accordance with the following methods.

(1) Mooney Viscosity

The Mooney viscosity [$ML_{1+4}$] was measured in accordance with the method of Japanese Industrial Standard K6300-1994 at 125° C. The obtained result is shown as an index using the result in Comparative Example 1 or 5 as the reference, which is set at 100. The smaller the value, the better the workability.

(2) Vulcanization Time: $t_c(90)$

The time passed before vulcanization reached 90% ($t_c(90)$) was measured by using a vibration type vulcanization tester in accordance with Japanese Industrial Standard K6300-1994 at 150° C. The obtained result is shown as an index using the result in Comparative Example 1 or 5 as the reference, which is set at 100. The smaller the value, the shorter the vulcanization time and the better the productivity of vulcanization.

(3) Resilience

A sample was vulcanized at 150° C. for 30 minutes and the resilience was measured at 25° C. by using a resilience tester manufactured by TOYO SEIKI SEISAKUSHO, Ltd. The obtained result is shown as an index using the result in Comparative Example 1 or 5 as the reference, which is set at 100. The greater the value, the higher the resilience and the better the fuel consumption.

Examples 1 to 8 and Comparative Examples 1 to 4

With 100 parts by weight of a rubber component prepared from 20 parts by weight of natural rubber and 110 parts by weight (the rubber component: 80 parts by weight; an extending oil: 30 parts by weight) of SBR 1712 [a trade mark; manufactured by JSR Corporation; a styrene-butadiene rubber], 20 parts by weight of carbon black [manufactured by TOKAI CARBON Co., Ltd.; SEAST KH, a trade mark], 50 parts by weight of precipitated silica [manufactured by NIPPON SILICA KOGYO Co., Ltd.; NIPSIL AQ, a trade mark] ($S_{Hg}$=140 m²/g), 4 parts by weight of a silane coupling agent "Si75" [a trade mark; manufactured by DEGUSSA AG.] (bis-3-triethoxysiliypropyl disulfide), an addition salt of an amine or an amine of the type shown in Table 1 in an amount also shown in Table 1, 5 parts by weight of an aromatic oil, 1 part by weight of wax, 1 part by weight of stearic acid, 1 part by weight of antioxidant 6PPD (N-phenyl-N'-(1,3-dimethylbutyl)-p-phenylenediamine), 3 parts by weight of zinc oxide, 0.5 parts by weight of vulcanization accelerator MBTS (dibenzothiazyl disulfide), 1 parts by weight of vulcanization accelerator TBBS (N-tert-butyl-2-benzothiazylsulfenamide) and 1.5 parts by weight of sulfur were mixed. In this manner, rubber compositions were prepared. The physical properties of the obtained rubber compositions are shown in Table 1.

TABLE 1-1

| Comparative Example | molecular weight | Example | | | | |
|---|---|---|---|---|---|---|
| | | 1 | 2 | 3 | 4 | 5 |
| Addition salts of an amine and amines (part by weight) | | | | | | |
| stearic acid salt of dimethylstearylamine | 581 | 5 | 10 | 1 | 15 | — |
| stearic acid salt of dimethyldecylamine | 469 | — | — | — | — | 5 |
| capric acid salt of dimethylstearylamine | 469 | — | — | — | — | — |

TABLE 1-1-continued

| Comparative Example | molecular weight | Example 1 | 2 | 3 | 4 | 5 |
|---|---|---|---|---|---|---|
| stearic acid salt of stearylamine | 553 | — | — | — | — | — |
| stearic acid salt of di(hydroxyethyl)stearylamine | 641 | — | — | — | — | — |
| ricinoleic acid salt of triethanolamine | 447 | — | — | — | — | — |
| dimethylstearylamine | 297 | — | — | — | — | — |
| triethanolamine | 149 | — | — | — | — | — |
| $B_w \times C_M \times S_{Hg}/C_w$ | | $8.1 \times 10^5$ | $4.1 \times 10^5$ | $4.1 \times 10^6$ | $2.7 \times 10^5$ | $6.6 \times 10^5$ |
| Physical properties | | | | | | |
| Mooney viscosity [$ML_{1+4}$] | | 86 | 80 | 98 | 77 | 83 |
| vulcanization time | | 89 | 79 | 99 | 70 | 85 |
| resilience | | 108 | 109 | 100 | 100 | 107 |

TABLE 1-2

| | Example | | | Comparative Example | | | |
|---|---|---|---|---|---|---|---|
| | 6 | 7 | 8 | 1 | 2 | 3 | 4 |
| Addition salts of an mine and amines (part by weight) | | | | | | | |
| stearic acid salt of dimethylstearylamine | — | — | — | — | — | — | — |
| stearic acid salt of dimethyldecylamine | — | — | — | — | — | — | — |
| capric acid salt of dimethylstearylamine | 5 | — | — | — | — | — | — |
| stearic acid salt of stearylamine | — | 5 | — | — | — | — | — |
| stearic acid salt of di(hydroxyethyl)stearylamine | — | — | 5 | — | — | — | — |
| ricinoleic acid salt of triethanolamine | — | — | — | — | — | — | 5 |
| dimethylstearylamine | — | — | — | — | 2.5 | — | — |
| triethanolamine | — | — | — | — | — | 2.5 | — |
| $B_w \times C_M \times S_{Hg}/C_w$ | $6.6 \times 10^5$ | $7.7 \times 10^5$ | $9.0 \times 10^5$ | — | $8.3 \times 10^5$ | $4.2 \times 10^5$ | $6.3 \times 10^5$ |
| Physical properties | | | | | | | |
| Mooney viscosity [$ML_{1+4}$] | 88 | 96 | 94 | 100 | 90 | 98 | 96 |
| vulcanization time | 88 | 84 | 92 | 100 | 104 | 86 | 89 |
| resilience | 106 | 106 | 103 | 100 | 104 | 98 | 96 |

Note: The numbers in the physical properties in Tables 1-1 and 1-2 are shown as indices using the result in Comparative Example 1 as the reference, which is set at 100. In Comparataive Examples 2 to 4, $C_w$ and $C_M$ are the amount by weight and the molecular weight of the added amine or salt of an amine, respectively.

As clearly shown in Table 1, the rubber compositions of Examples 1, 2 and 5 to 8 were more excellent than the rubber composition of Comparative Example 1 with respect to all physical properties. In the rubber compositions of Examples 1, 2 and 5 to 8, the value of ($B_w \times C_M \times S_{Hg}/C_W$) was in the preferable range and it is shown that the resilience was more excellent than that in Examples 3 and 4. The rubber composition of Comparative Example 2 in which a tertiary amine is added showed a considerably longer vulcanization time than the rubber compositions of Examples. The rubber compositions of Comparative Examples 3 and 4 in which triethanolamine or a fatty acid salt of triethanolamine was added showed poor resilience.

Examples 9 to 11 and Comparative Example 5

With 100 parts by weight of a rubber component prepared from 30 parts by weight of natural rubber and 96.25 parts by weight (the rubber component: 70 parts by weight; an extending oil: 26.25 parts by weight) of SBR 1712 [a trade mark; manufactured by JSR Corporation; an oil extended styrene-butadiene rubber], 10 parts by weight of carbon black [manufactured by TOKAI CARBON Co., Ltd.; SEAST KH, a trade mark], 40 parts by weight of precipitated silica [manufactured by NIPPON SILICA KOGYO Co., Ltd.; NIPSIL E200A, a trade mark] ($S_{Hg}$=110 m²/g), an addition salt of an amine of the type shown in Table 2 in an amount also shown in Table 2, 1 part by weight of wax, 1 part by weight of stearic acid, 1 part by weight of antioxidant 6PPD (N-phenyl-N'-(1,3-dimethylbutyl)-p-phenylenediamine), 3 parts by weight of zinc oxide, 1 parts by weight of vulcanization accelerator MBTS (dibenzothiazyl disulfide), 1 parts by weight of vulcanization accelerator TBBS (N-tert-butyl-2-benzothiazylsulfenamide) and 1.5 parts by weight of sulfur were mixed. In this manner, rubber compositions were prepared. The physical properties of the obtained rubber compositions are shown in Table 2.

TABLE 2

|  | Example | | | Comparative Example |
|---|---|---|---|---|
|  | 9 | 10 | 11 | 5 |
| Stearic acid salt of dimethylstearylamine (part by weight) | 3 | 7 | 10 | — |
| $B_W \times C_M \times S_{Hg}/C_W$ | $6.6 \times 10^5$ | $7.7 \times 10^5$ | $2.6 \times 10^5$ | — |
| Physical properties |  |  |  |  |
| Mooney viscosity [$ML_{1+4}$] | 92 | 85 | 81 | 100 |
| vulcanization time | 86 | 79 | 69 | 100 |
| resilience | 105 | 104 | 100 | 100 |

Note: The numbers in the physical properties are shown as indices using the result in Comparative Example 5 as the reference, which is set at 100.

As clearly shown in Table 2, the rubber compositions of Examples 9 and 10 were more excellent than the rubber composition of Comparative Example 5 with respect to all physical properties. In the rubber compositions of Examples 9 and 10, the value of ($B_w \times C_M \times S_{Hg}/C_W$) was in the preferable range and it is shown that the resilience was more excellent than that in Example 11.

What is claimed is:

1. A rubber composition which comprises (A) at least one rubber component selected from the group consisting of natural rubber and diene synthetic rubbers, (B) an inorganic filler comprising at least one filler selected from the group consisting of silica and silicate as a main component and (C) an addition salt of an amine represented by general formula (I):

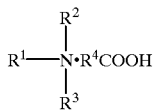

(I)

wherein $R^1$ represents a saturated or unsaturated alkyl group having 8 to 24 carbon atoms, an aryl group having 6 to 24 carbon atoms or an aralkyl group having 7 to 24 carbon atoms, $R^2$ and $R^3$ each independently represent hydrogen atom, a saturated or unsaturated alkyl group having 1 to 12 carbon atoms, an aryl group having 6 to 12 carbon atoms, an aralkyl group having 7 to 12 carbon atoms or a group represented by any of the following formulae:

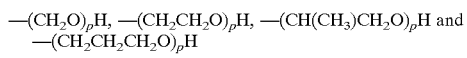

wherein a total of p in $R^2$ and $R^3$ represents an integer of 1 to 4 when at least one of $R^2$ and $R^3$ represents any of above groups, and $R^4$ represents a saturated or unsaturated alkyl group having 6 to 24 carbon atoms, an aryl group having 6 to 24 carbon atoms or an aralkyl group having 7 to 24 carbon atoms.

2. A rubber composition according to claim 1, wherein the silica in component (B) is precipitated silica.

3. A rubber composition according to claim 1, wherein, in general formula (I) representing the addition salt of an amine of component (C), $R^2$ and $R^3$ each independently represents a saturated or unsaturated alkyl group having 1 to 8 carbon atoms and a total number of carbon atoms in groups represented by $R^1$, $R^2$ and $R^3$ is 10 to 24.

4. A rubber composition according to claim 1, which comprises 10 to 120 parts by weight of component (B) per 100 parts by weight of component (A).

5. A rubber composition according to claim 1, wherein component (C) satisfies following equation (II):

$$3 \times 10^5 \leq B_w \times C_M \times S_{Hg}/C_W \leq 4 \times 10^6 \tag{II}$$

wherein $B_w$ is the amount in part by weight of component (B), $C_W$ is the amount by parts by weight of component (C), $C_M$ is the molecular weight of component (C) and $S_{Hg}$ (m²/g) is the specific surface area of component (B) measured in accordance with a mercury porosimetry.

6. A rubber composition according to claim 1, which further comprises (D) a coupling agent in an amount of 1 to 20% by weight of component (B).

7. A rubber composition according to claim 6, wherein the coupling agent of component (D) is at least one compound selected from the group consisting of:

compounds represented by general formula (III):

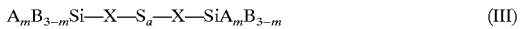

(III)

wherein A represents $C_nH_{2n+1}O$, n representing an integer of 1 to 3, or a chlorine atom, B represents an alkyl group having 1 to 3 carbon atoms, X represents a saturated or unsaturated alkylene group having 1 to 9 carbon atoms or an arylene group having 7 to 15 carbon atoms, m represents an integer of 1 to 3, a represents an integer of 1 or greater which may have a distribution, two groups represented by B may be the same with or different from each other when m represents 1 and two or three groups represented by A may be the same with or different from each other when m represents 2 or 3, respectively;

compounds represented by general formula (IV):

(IV)

wherein A represents $C_nH_{2n+1}O$ n representing an integer of 1 to 3, or a chlorine atom, B represents an alkyl group having 1 to 3 carbon atoms, X represents a saturated or unsaturated alkylene group having 1 to 9 carbon atoms or an arylene group having 7 to 15 carbon atoms, Y represents a mercapto group, a vinyl group, an amino group, a glycidoxy group or an epoxy group, m represents an integer of 1 to 3, two groups represented by B may be the same with or different from each other when m represents 1 and two or three groups represented by A may be the same with or different from each other when m represents 2 or 3, respectively; and compounds represented by general formula (V):

(V)

wherein A represents $C_nH_{2n+1}O$, n representing an integer of 1 to 3, or a chlorine atom, B represents an alkyl group having 1 to 3 carbon atoms, X represents a saturated or unsaturated alkylene group having 1 to 9 carbon atoms or an arylene group having 7 to 15 carbon atoms, Z represents a benzothiazolyl group, an N,N-dimethylthiocarbamoyl group, a methacryloyl group or a saturated or unsaturated hydrocarbon group having 1 to 15 carbon atoms, m represents an integer of 1 to 3, a represents an integer of 1 or greater which may have a distribution, two groups represented by B may be the same with or different from each other when m represents 1 and two or three groups represented by A may be the same with or different from each other when m represents 2 or 3, respectively.

8. A pneumatic tire which is produced by using a rubber composition described in claim 1.

* * * * *